(12) United States Patent
Dulphy-Vigor et al.

(10) Patent No.: US 6,345,214 B1
(45) Date of Patent: Feb. 5, 2002

(54) DEVICE FOR MONITORING THE STORAGE LEVEL OF A PRODUCT STORED IN A TANK

(76) Inventors: Veronique Dulphy-Vigor, Chicago, IL (US); Laurent Ferenczi, Paris; Nicolas Viard, Buc, both of (FR)

( * ) Notice: Subject to any disclaimer, the term of this patent is extended or adjusted under 35 U.S.C. 154(b) by 0 days.

(21) Appl. No.: 09/102,075

(22) Filed: Jun. 22, 1998

(30) Foreign Application Priority Data

Jun. 26, 1997 (FR) .................................................. 97 08029

(51) Int. Cl.$^7$ ............................ G05D 11/00; G01F 23/00
(52) U.S. Cl. ...................... 700/281; 73/290 R; 73/301; 340/618; 340/870.16
(58) Field of Search ............................ 73/301, 302, 303, 73/290 R; 222/61; 137/392; 700/281, 283; 340/870.16, 504, 618

(56) References Cited

U.S. PATENT DOCUMENTS

| | | | | |
|---|---|---|---|---|
| 4,201,240 | * | 5/1980 | Case ........................................ | 73/301 |
| 4,630,245 | * | 12/1986 | Dam ........................................ | 367/93 |
| 4,782,451 | | 11/1988 | Mazzarella et al. . | |
| 4,788,648 | * | 11/1988 | Ferretti et al. ........................... | 702/55 |
| 4,845,486 | * | 7/1989 | Knight et al. ........................... | 340/618 |
| 5,023,806 | * | 6/1991 | Patel ........................................ | 364/509 |
| 5,181,467 | * | 1/1993 | Takekoshi .............................. | 101/147 |
| 5,316,181 | * | 5/1994 | Burch ...................................... | 222/61 |
| 5,619,560 | * | 4/1997 | Shea ....................................... | 379/106.04 |
| 5,708,424 | * | 1/1998 | Orlando et al. ........................ | 340/870.08 |
| 5,887,602 | * | 3/1999 | Iwama ..................................... | 134/43 |

FOREIGN PATENT DOCUMENTS

| | | |
|---|---|---|
| 2 554 230 | 5/1985 | (FR) . |
| 62-292998 | 12/1987 | (JP) . |
| WO 96/29578 | 9/1996 | (WO) . |

OTHER PUBLICATIONS

G. Kessler and S. Shepard, Network Working Group Request For Comments 1739, published Dec. 1994.*
J. Postel, Network Working Group Request For Comments 777, published Apr. 1981.*

* cited by examiner

Primary Examiner—Hezron Williams
Assistant Examiner—Michael Cygan

(57) ABSTRACT

The device for monitoring the storage level of a product contained in a tank includes a device for measuring the storage level of the product, a central processing unit for utilizing the level read off by the measurement device, a memory for holding at least one storage level threshold, a device for comparing a level value output by the central processing unit with the threshold, a device for triggering a restocking command and controlled by the comparison device, and a device for transmitting the restocking command to a restocking center. It furthermore includes a device for receiving at least one time of information which is issued by the restocking center in response to the transmission of the restocking command.

2 Claims, 2 Drawing Sheets

DEVICE FOR MONITORING THE STORAGE LEVEL OF A PRODUCT STORED IN A TANK

Figure 1:
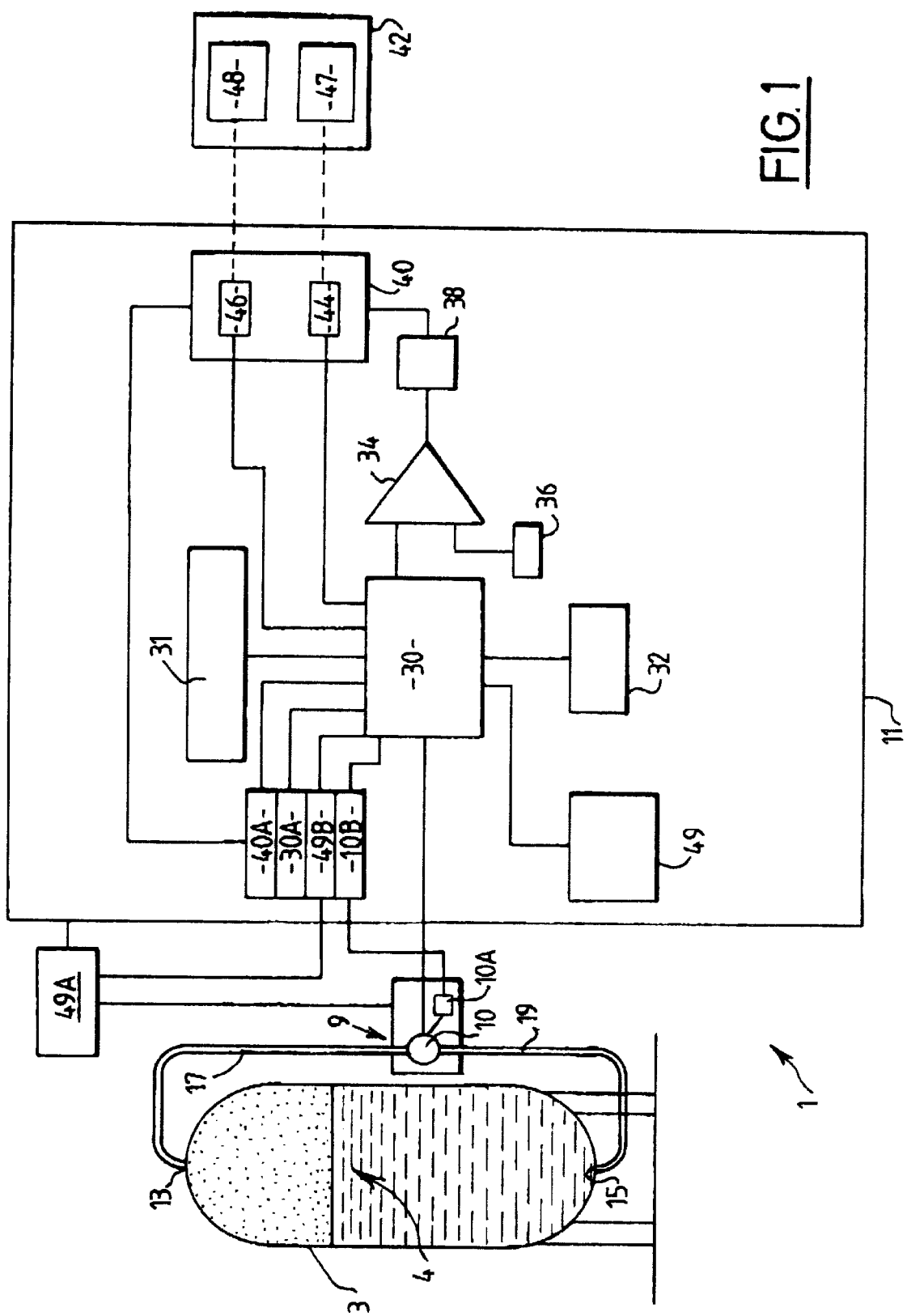

The invention relates to a device for monitoring the storage level of a product contained in a tank. More particularly, it lies in the field of the distribution of bulk products such as industrial gases, petrol, etc. which are stored in tanks or appropriate storage facilities, installed on industrial sites at customers' premises close to the installations which consume these products.

Tanks are known which are equipped with a device for monitoring product storage level comprising a sensor for measuring the quantity of product contained in the tank and an associated controller for utilization thereof. The controller continuously scrutinizes the storage level of the tank output by the sensor and, depending on a preset threshold, transmits a restocking command, for example via a telephone network, to a centre of a supplier responsible for stocking the tank. Additionally, the known device is furnished with a digital or analog display controlled by the controller so that the customer can at any moment ascertain the quantity of product remaining in the tank.

This known device has the drawback that only the storage level of the product is displayed. Consequently, the customer has no means of knowing on the one hand whether or not a restocking command has been sent and, on the other hand, should it have been sent, whether this command has been recorded by the supplier. Therefore, the customer is in a state of uncertainty and must himself check whether the storage level has dropped below the preset threshold, this requiring regular intervention on his part. Once he has noted that the threshold has been crossed, he is compelled to contact the supplier so as to request confirmation from the latter that a restocking command for the tank in question has indeed been recorded. Moreover, before he has contacted the supplier, he does not know the day on which the latter will call. This is why he must at all times be ready to make the necessary arrangements for the filling of the tank in question, such as, for example, shutting down the installations which are fed from it. Out of concern for quality of service on the part of the supplier, this onus of customer-side checking is undesirable.

Additionally, in the case of the known devices which display only the storage level, it is sometimes difficult for the customer to perceive certain malfunctions such as, for example, inconsistent measurement values output by a faulty sensor.

The present invention aims to alleviate these various drawbacks by proposing a monitoring device which makes it possible to inform a customer using a product storage tank more fully as to the current state of the tank and as to the state of operation of the device, and especially as to the fact that a restocking command has indeed been recorded at the restocking centre without the user having to do anything to, for example, contact his supplier.

To this end, the subject of the invention is a device for monitoring the storage level of a product contained in a tank, comprising means for measuring the storage level of the product, a central processing unit for utilizing the level read off by the measurement means, memory means for holding at least one storage level threshold, means for comparing a level value output by the central processing unit with the said threshold, means for triggering a restocking command and controlled by the comparison means, and means for transmitting the restocking command to a restocking centre, characterized in that it furthermore comprises means for receiving at least one item of information which is issued by the said restocking centre in response to the transmission of the said restocking command, and in that it comprises a display unit which exhibits an area for displaying the said item of information issued by the restocking centre.

The device according to the invention may additionally comprise one or more of the following characteristics:

the device comprises means for checking the operation of the central processing unit, and the display unit comprises an area for displaying the state of operation of the central processing unit, the device comprises means for checking the operation of the means for measuring the storage level of the product, and the display unit comprises an area for displaying the state of operation of the measurement means, the device comprises means for checking the operation of the transmission and reception means, and the display unit comprises an area for displaying the state of operation of the transmission and reception means, the device comprises means for calibrating the means for measuring the storage level and means for checking the operation of the calibration means, and the display unit comprises an area for displaying the state of operation of the calibration means, the device comprises a back-up electrical power supply unit, means for checking the operation of the back-up electrical power supply, and the display unit comprises an area for displaying the state of operation of the electrical power supply unit, the display unit comprises at least two areas for displaying the storage level of the product, one of which is of the type with incremental display and the other of the type with digital display—the display unit comprises a liquid crystal display.

The subject of the invention is also a tank comprising a monitoring device of the type defined above.

Figure 2:
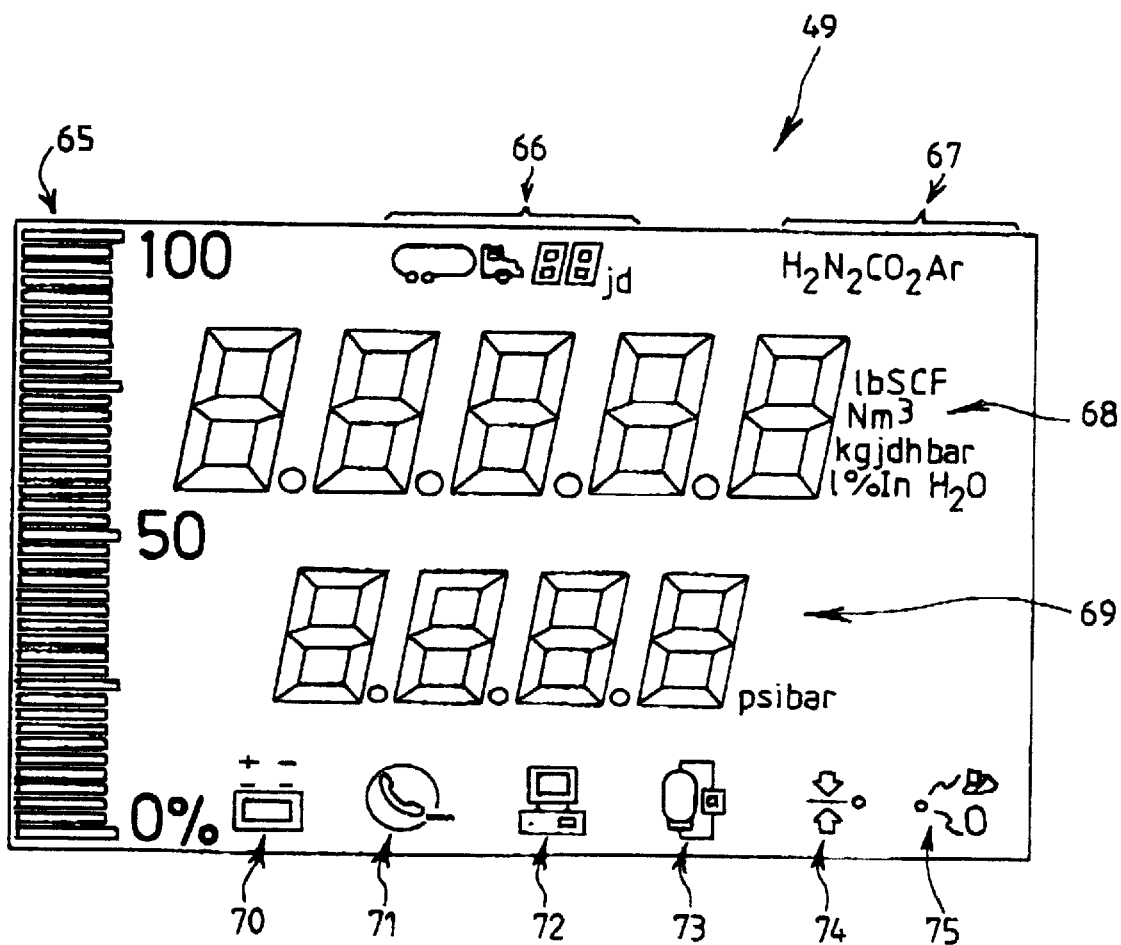

Other characteristics and advantages of the invention will emerge from the following description given by way of non-limiting example with regard to the appended drawings in which:

FIG. 1 is a schematic diagram of the device according to the invention installed on a tank for storing a liquefied gas, and FIG. 2 is an illustrative embodiment of a screen of a display unit of the device according to the invention.

Represented in FIG. 1 is a device 1 for monitoring the storage level according to the invention. This device 1 is installed on a thermally insulated tank 3 containing a liquefied gas 4, such as liquid nitrogen for example.

The device 1 comprises means 9 for measuring the storage level of the liquefied gas 4, and a unit 11 for processing the signals output by the measurement means 9. The means 9 comprise a sensor 10 for measuring on the one hand the absolute pressure existing in the tank 3 and on the other hand the differential pressure between a high point 13 and a low point 15 of the tank 3. To this end, the sensor 10 is linked to these high 13 and low 15 points by a capillary 17, 19 respectively. Such a sensor requires regular calibration owing to be the time-defining of the "zero" reference. This is why the measurement means 9 are additionally equipped with a unit 10A for calibrating the sensor 10.

The unit 11 comprises a central processing unit 30 linked to the sensor 10 so as to utilize the signals output by the latter, a memory 31 linked to a central processing unit 30 and intended for holding the values which correspond to measurement instants output by a clock 32, product storage level values associated with these measurement instants as well as values which correspond to the product quantities consumed between two successive measurement instants. Furthermore, the processing unit 11 comprises comparison means 34 one input of which is linked to the central processing unit 30 and another input of which is linked to memory means 36 for holding a storage level threshold predefined in advance.

Depending on the result of the comparison, the comparison means 34 instruct means 38 for triggering a restocking command.

The processing means 11 furthermore comprise means for communication 40 of the device 1 with a restocking centre 42 which is remote from the tank 3, for example in another town. These communication means 40 comprise on the one hand means 44 for transmitting and on the other hand means 46 for receiving information respectively to or from the restocking centre 42 which cooperate with corresponding units 47 and 48 of the restocking centre.

The transmission means 44 are linked to an output of the triggering means 38 so as to issue, as a function of a command received by these means 38, a restocking command to the centre 42. Furthermore, the transmission means 44 are linked to the central processing unit 30 so as to transmit additional information calculated by this unit 30, such as a date before which there should be a product delivery and the estimated quantity of product which can be input into the tank 3 on the abovementioned date, to the centre 42.

The reception means 46 are linked to the central processing unit 30 so as to transmit to the latter information received from the centre 42, especially information received in response to the recording by this centre of a restocking command, such as an acknowledgement of receipt and a forecast delivery deadline.

Advantageously, the device 1 is equipped with a back-up electrical power supply 49A such as a battery which, in the event of a power failure, makes it possible to ensure the continuity of operation of the device 1 by supplying the necessary electrical energy to the measurement means 9 and to the processing unit 11.

In order to inform a user as to the state of the tank 3 and as to the state of operation of the device 1, the processing unit 11 comprises on the one hand various means for checking the state of operation of the units and means of the device 1 and on the other hand a unit 49 for displaying particular information, especially information received from the centre 42 and information read off by these checking means and by the measurement means 9. This display unit 49 is controlled by part of the central processing unit 30.

As regards the checking means, the device 1 comprises more particularly means 30A for checking the state of operation of the central processing unit 30, means 40A for checking the state of operation of the communication means 40, means 49B for checking the state of operation of the back-up electrical power supply 49A, means 10B for checking the state of operation of the calibration unit 10A. By ensuring the validity of the signals output by the sensor 10, the central processing unit 30 additionally constitutes a means for checking the state of operation of the sensor 10. With a view to the displaying by the display unit 49 of the information read off, the checking means 10B, 30A, 40A and 49B are each linked to the central processing unit 30.

The unit 49 is preferably a liquid crystal display equipped with back-lit screen which adapts automatically to the brightness of the environment in which the screen is located. A liquid crystal display has the advantage that it can operate within a wide range of temperatures and even under difficult weather conditions.

FIG. 2 shows an illustrative embodiment of the screen layout of such a display unit 49.

The screen of the display unit 49 is subdivided into various areas 65 to 75 each displaying, depending on the commands received from the central processing unit 30, a single item of information. Because identical information is always displayed at the same location on this screen, the customer can quickly identify the state of the tank 3 and the state of operation of the device 1 itself.

The various display areas of the unit 49 as well as the information displayed therein will be described in detail below.

Located in the left-hand part of the screen is an area 65 for displaying the storage level of product contained in the tank 3. This level display area 65 is produced in the form of a percentage incremental display from 0 to 100% of the degree of fill of the tank 3 extending over the entire height of the screen. This area 65 is continually in operation and the value displayed is refreshed after each measurement of the storage level.

Arranged in the upper central part of the screen is an area 68 for the digital display of either the product storage level in a unit defined in advance such as lb, SCF, $Nm^3$, kg etc., or of the reserve of the tank 3. The reserve of the tank 3 is understood to mean the estimated duration in hours or in days until the stock of product is exhausted. This duration is calculated by the central processing unit 30 on the basis of the consumption figures recorded in the memory 31.

In the lower central part of the screen of the unit 49 there is an area 69 for displaying the absolute pressure existing in the tank 3, this in a unit predefined in advance.

Above the area 68, in the right-hand part of the screen, there is an area 67 for permanently displaying the type of product, for example $H_2$, $N_2$, $CO_2$ or AR, stored in the tank 3.

Located above the area 68 and between the areas 65 and 67 is an area 66 for displaying a message signalling the receipt of an acknowledgement of receipt. This display comprises two parts, a first showing a picture of a restocking truck and a second for displaying a delivery deadline in days. Thus, after having received the restocking command sent by the device 1, the restocking centre 42 sends to the device an acknowledgement of receipt to signal the recording of this command, and an estimated or actual delivery deadline. Thus, the customer is able to make all the necessary arrangements for the delivery, for example shutting down the installations fed from the tank.

Arranged side by side beneath the area 69, to the right of the area 65, are areas 70 to 75 for displaying information read off by the checking means 10B, 30, 30A, 40A and 49B.

The area 70 displays the picture of a battery when the device has detected a power failure and operates with the aid of the electricity provided by the battery 49A. Provision is moreover made for the picture of the battery in the area 70 to flash if the checking means 49B have detected that the electrical energy stored up in the battery 49A is almost exhausted.

Represented in the area 71 is a picture showing, surrounded by a circle, a telephone handset. This picture is displayed by the screen when the communication means 40 are transferring or receiving information respectively to or from the restocking centre 42. Moreover, there is furthermore provision for a displaying of this picture in slow flashing mode and another in rapid flashing mode. The slow flashing mode is triggered when the transmission means 44 have received, from the means 38, a command to transmit a restocking command to the centre 42, but cannot establish a communication link with the latter. The rapid flashing mode is triggered when the means 40A for checking the communication means 40 have detected a fault in the communication means 40.

Represented in the zone 72 is a picture showing a computer. This picture is displayed continuously if the means 30A have read out correct operation of the central processing unit 30. When the unit 30 is being initialized, for example following a command received from the centre 42, this picture flashes slowly. In the event that the checking means 30A have discerned that an error has occurred in the operation of the unit 30, the picture flashes rapidly.

Represented in the zone 73 is a picture symbolizing the tank 3 equipped with the measurement sensor 10. If the screen displays this picture continuously, the central processing unit 30 which checks the signals output by the sensor 10 from a validity point of view, has read off that the latter is operating normally. If the sensor outputs inconsistent signals which are therefore invalid, this picture is displayed in a slow flashing mode. By contrast, if the sensor outputs no signals at all, this picture is displayed in a rapid flashing mode showing the customer that the sensor is faulty.

Represented in the display area 74 is a picture showing two opposing arrows pointing towards a line marking a "zero" reference. This picture is displayed continuously when the unit 10A is calibrating the "zero" reference of the sensor 10. If this calibration has to be redone, this picture is displayed in a slowly flashing mode. If the calibration unit 10A is faulty, this picture is displayed in a rapidly flashing mode.

Moreover, there is provision to link the device according to the invention to other monitoring terminals. To this end, when the device is transmitting information towards an additional terminal of this kind, the picture in the area 75 showing a dot linked on the one hand to a terminal and on the other hand to a tank, is displayed.

To issue a restocking command, the device 1 operates as follows:

At instants determined by the clock 32 the central processing unit 30 reads off the storage level output by the sensor 10 and records this level, the corresponding measurement instant and the consumption between two measurement instants in the memory 32. On the basis of the measurement and/or of the values of the consumption figures recorded in the memory 31, the central processing unit outputs a storage level value to the comparison means 34. This value may be the level just measured and perhaps also an estimate of the storage level at a future instant. The means 34 compare this value with the threshold recorded in the memory means 36 and, if the value is below the threshold, send a command to the means 38 so that the latter trigger the sending of a restocking command to the centre 42 by the transmission means 44. Immediately or after a certain delay during which it schedules the rounds of its restocking vehicles, the centre 42 sends an acknowledgement of receipt and an estimated or actual delivery deadline. This information is then received by the means 46 and transmitted to the central processing unit 30 so as to be displayed on the screen of the display unit 49.

Advantageously, the unit 11 for processing the signals output by the sensor 10 is embodied in the form of a computer loaded with a suitable program and equipped with a card for the analog/digital conversion of the signals from the sensor 10 and with a modem for transmitting and receiving, for example via a telephone network, information respectively to or from the restocking centre 42.

What is claimed is:

1. A system for monitoring a storage level of a product in a tank and for requesting that the product be restocked, the system comprising, in a vicinity of the tank, a local unit with a first telecommunication transmitter that sends a restocking command and a first telecommunication receiver that receives restocking information, and, at a product restocking center geographically remote from said local unit, a second telecommunication transmitter that sends the restocking information upon receipt of the restocking command and a second telecommunication receiver that receives the restocking command, the restocking information including an acknowledgement of receipt of the restocking command and an estimate of days to restocking of the product:

said local unit comprising;

a sensor adjacent to the tank providing a level signal indicating the storage level of the product in the tank, a central processing unit that receives the level signal and converts the level signal to a storage level value, and that is connected to said first telecommunication receiver and processes the restocking information, a memory holding a storage level threshold, a comparator connected to said first memory and to said central processing unit, said comparator comparing the storage level value to the storage level threshold and indicating when the storage level value is less than the storage level threshold, a trigger connected to said comparator and to said first telecommunication transmitter, said trigger issuing a restocking command to said first telecommunication transmitter when said comparator indicates that the storage level value is less than the storage level threshold, and display connected to said central processing unit and displaying the restocking information.

2. The device of claim 1, wherein said first and second telecommunication transmitters and receivers are in a telephone network.

* * * * *